H. MALOTT.
STORE FRONT CONSTRUCTION.
APPLICATION FILED SEPT. 10, 1917.
1,283,247.
Patented Oct. 29, 1918.
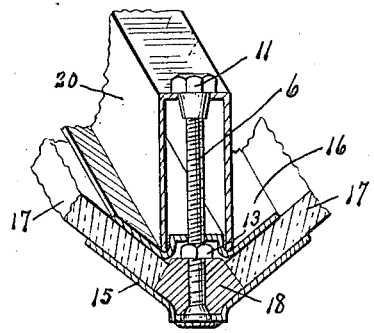
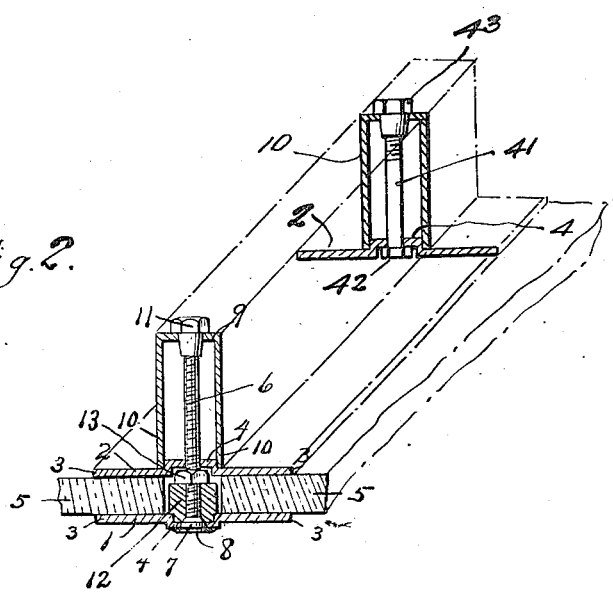
Inventor
Herbert Malott.
By Pagelsen and Spencer
Attorneys

UNITED STATES PATENT OFFICE.

HERBERT MALOTT, OF DETROIT, MICHIGAN.

STORE-FRONT CONSTRUCTION.

1,283,247.  Specification of Letters Patent.  Patented Oct. 29, 1918.

Application filed September 10, 1917. Serial No. 190,439.

*To all whom it may concern:*

Be it known that I, HERBERT MALOTT, a citizen of the United States, and residing at Detroit, in the county of Wayne and State of Michigan, have invented a new and Improved Store-Front Construction, of which the following is a specification.

This invention relates to store fronts of the general type wherein the adjacent panes or sheets of glass are held in proper position by upright resilient metal members secured together to constitute strong and attractive structures which bridge across between said sheets of glass, and its object is to provide substantially rigid metal glass-supporting bars which shall have great strength and which may be constructed at comparatively moderate expense.

This invention consists, in combination with two narrow longitudinally ribbed plates, one on the front and the other on the back, of two adjacent sheets of glass and having their ribs projecting outwardly from said sheets of glass, a rigid channel bar extending along and preferably over the rib of one of the plates, and bolts extending through both of the plates and the channel bar. It further consists in the details of construction shown in the accompanying drawing and particularly pointed out in the claims.

In the accompanying drawing, Figure 1 is a perspective view and section of a corner bar connecting two sheets of glass. Fig. 2 is a perspective view and section of a division bar.

Similar reference characters refer to like parts throughout the several views.

The simplest embodiment of this invention is shown in Fig. 2, wherein two similar narrow metal plates 1 and 2, each consisting of the outer or bearing strips 3 and the intermediate or rib-portion 4, engage the alined sheets 5 of glass. A bolt 6 having a shoulder 7 and a head 8 on the outer side of the front plate 1 extends through a hole in the rib-portion of the back plate 2 and through a hole in the central portion of a channel bar 9 whose sides 10 fit the edges of the rib 4 of the back plate 2.

A nut 11 on the outer end of this bolt causes the plates 1 and 2 to firmly engage the sheets of glass and the channel is held so firmly against the back plate 2 that a very rigid structure is produced.

Short spacing blocks 12 of wood, rubber or other suitable material are held by means of the nuts 13 in the groove formed in the face plate 1. It will be understood that as many of these bolts 6 may be used as desired, a spacing of about twelve inches having been found desirable for division bars having a face width of two inches.

The same ribbed plates may be bent to any desired angle, and in most cases the front and back plates are rolled from metal ribbons of the same width, preferably copper, the channels being preferably of steel.

In Fig. 1, the front plate 15 is wider than the back plate 16, because of the manner of bending the plates to fit the adjacent edges of the sheets 17 of glass. The spacing blocks 18 fitting the groove in the front plate 15 are again held in place by means of nuts 13 on the bolts 6. Besides acting as spacers, these blocks and nuts serve to hold the bolts perpendicular to the face plates so that the bar can be readily assembled. These bolts are preferably all of the same spacing so that the face and back plates and the channel bars 20 will always be interchangeable.

By forming the front and back plates with oppositely projecting ribs, a structure of great strength is obtained with a minimum of material, this strength being increased by the use of the channel bar which fits the rib of one of these plates and thus acts in substantially the same manner as if it were integral therewith. This channel bar is usually placed on the inside of the building so that the nuts 11 cannot be removed by unauthorized persons.

It has been found desirable to connect the back plates and the reinforcing channel bars independently from the bolts 6 in order that these two members may be set up as a unit preparatory to the placing of the glass. For this purpose bolts 41 having heads 42 in the rib-portion 4 as shown in Fig. 2 may be employed, the nuts 43 securing these two members firmly together. These bolts will usually be at each end of the bars and plates and if these members are very long, one or more bolts 41 may be positioned intermediate the ends of the bars.

I claim:

1. A bar for bridging between adjacent edges of sheets of glass comprising narrow face and back plates of metal extending longitudinally of said edges, each plate having edge portions lying flat against the glass and a middle portion or rib extending outwardly to constitute a stiffening rib, a wood spacer secured to the front plate between said edge portions, a reinforcing channel bar extending along the back plate with its edges in engagement with said edge portions that engage the glass, and bolts extending through the front and back plates and reinforcing channel.

2. A bar for bridging between adjacent edges of alined sheets of glass comprising face and back plates of metal extending longitudinally of said edges, each plate having edge portions lying flat against the glass and a middle portion extending out away from the plane of the glass to constitute a stiffening rib, a reinforcing channel bar extending along the back plate with its edges in engagement with said edge portions that engage the glass, and bolts extending through the front and back plates and stiffening channel.

3. A bar for bridging between adjacent edges of sheets of glass comprising narrow face and back plates of metal extending longitudinally of said edges, each plate having edge portions lying flat against the glass and a middle portion extending out away from the plane of the glass to constitute a stiffening rib, a reinforcing channel bar extending along the back plate with its edges in engagement with said edge portions that engage the glass, bolts extending through the front and back plates and stiffening channel, and additional bolts extending through the channel bar and back plate alone to secure these two members together as a unit.

HERBERT MALOTT.

Copies of this patent may be obtained for five cents each, by addressing the "Commissioner of Patents, Washington, D. C."